UNITED STATES PATENT OFFICE.

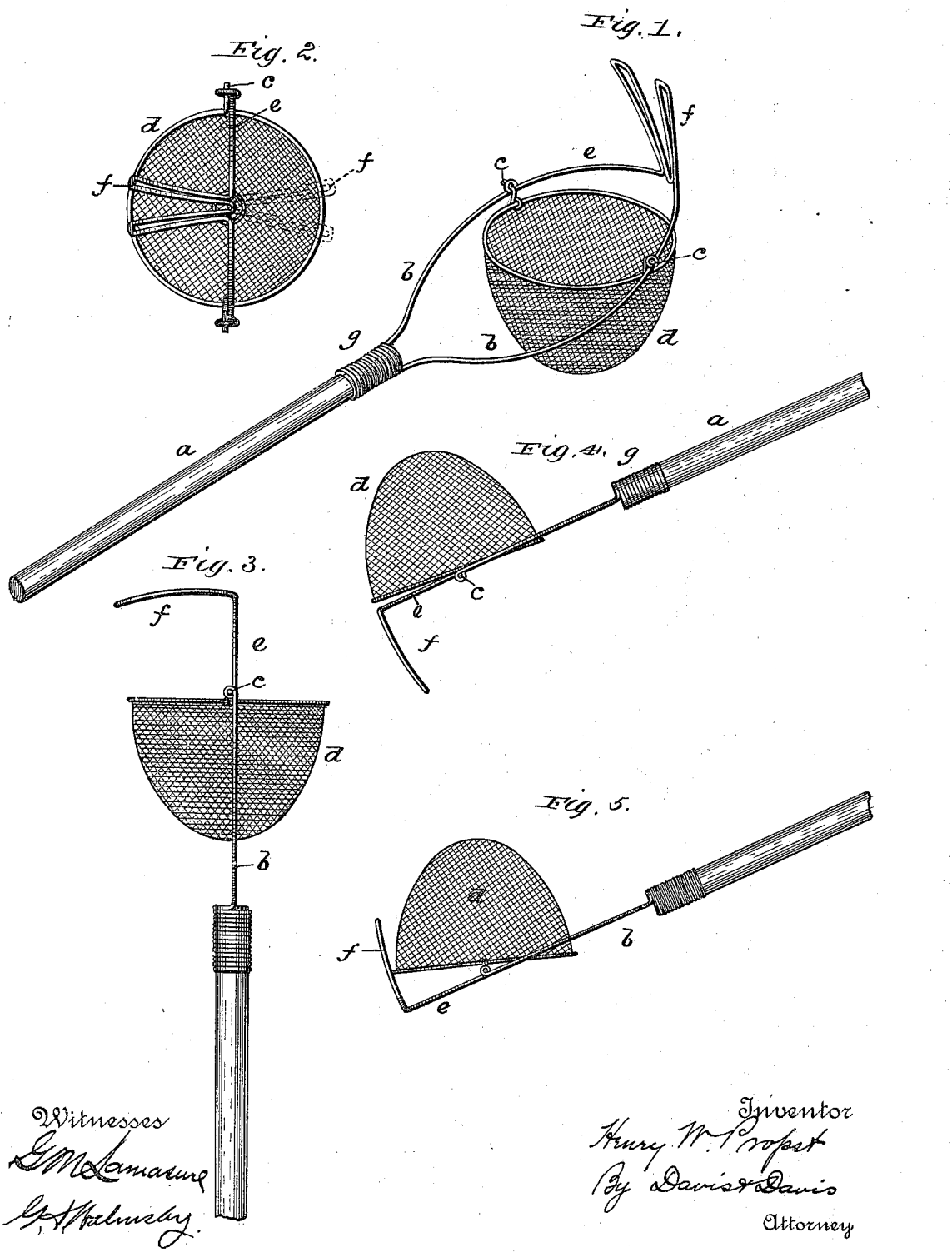

HENRY W. PROPST, OF WEST LIBERTY, IOWA.

FRUIT-PICKER.

SPECIFICATION forming part of Letters Patent No. 617,258, dated January 3, 1899.

Application filed May 17, 1898. Serial No. 680,956. (No model.)

*To all whom it may concern:*

Be it known that I, HENRY W. PROPST, a citizen of the United States, residing at West Liberty, in the county of Muscatine, in the State of Iowa, have invented certain new and useful Improvements in Fruit-Pickers, of which the following is a specification, reference being had therein to the accompanying drawings, in which—

Figure 1 is a perspective view of my device, showing it in the position it is held when taking fruit hanging low; Fig. 2, a top view, and Fig. 3 a side elevation showing the device in the position of picking fruit directly overhead; and Figs. 4 and 5 side elevations showing the device in the act of emptying the fruit from the basket.

The object of the invention is to provide a simple device for picking fruit from trees rapidly and without injury to the fruit, the device being attached to the end of a long pole to avoid the necessity of climbing into the trees, as more fully hereinafter set forth.

As shown in the drawings, the device consists of a pole $a$, having securely attached to its upper end a pair of spreading arms or forks $b$, in the upper ends of which are journaled the pivots $c$ of a fruit-basket $d$, said pivots extending outward from diametrically opposite points of the rim of the basket and in a line transverse to the pole, said basket being adapted to freely swing between the supporting-arms $b$. Attached to the upper ends of arms $b$ is an arch $e$, which lies in substantially the same plane with said arms and which carries at its center a lateral fruit-picking fork $f$, which extends outward and is slightly curved to better engage the stem of the fruit. By preference the arms $b$, arch $e$, and fork $f$ are made of a single piece of wire whose ends are coiled to form a suitable socket $g$ for attachment to the handle; but it is evident that the parts may be made separately and attached together, if desired.

The manner of using the device is obvious. The operator engages the stem of the fruit with fork $f$, and by a slight twist or pull detaches the fruit and allows the same to drop into the basket, the latter swinging freely between the supports and assuming a position directly under the fork in all picking positions. It will therefore be seen that the basket is adapted to swing freely independently of the detaching device and in both directions, whereby it will not interfere with the proper adjustment of the picking device and will enable the operator to pick in all directions with ease whether the fruit hang high or low. It will also be observed that the arch and fork $f$ act as stops in emptying the basket, and that the basket may be emptied toward either side without touching it with the hands, as shown in Figs. 4 and 5. It will further be observed that by thus supporting the detaching device independently of the basket and having the basket swing freely toward either side I may duplicate the detaching-fork, as shown in dotted lines in Fig. 2; but I prefer the use of a single fork as being the simpler form. It is also obvious that I may employ any suitable device for detaching the fruit and that the arch $e$ may be any suitable shape, it being simply essential that it or a part carried by it serve as a stop for preventing the basket turning over on its pivots in emptying the fruit and also that it afford a support for the detaching device. It will be observed that by thus connecting the detaching-fork rigidly to the pole and having it extend laterally transversely to the line of the pivots of the basket and from a point approximately over the center of the basket the operator is enabled to reach out radially in all directions from the point where he stands and detach the fruit by a slight endwise pull of the pole, taking fruit at all elevations with equal ease. Thus adapting the device to taking low-hanging fruit without the necessity of getting directly or nearly directly under the fruit is obviously of advantage in that it enables a long pole to be conveniently used.

Having thus fully described my invention, what I claim, and desire to secure by Letters Patent, is—

1. In a fruit-picker, the combination of a pole, carrying supporting-arms at its end, a fruit-detaching device supported upon said arms above the same, and a fruit-basket pivoted between said arms and adapted to swing freely to either side of the arms independently of the arms and detaching device, substantially as described.

2. In a fruit-picker, the combination of a pole, a pair of arms attached to one end thereof, a basket pivoted between the arms and swinging freely to either side of the arms so as to maintain its open side upward in all picking positions, a supporting part carried by said arms and extending from one to the other, over the basket, and carrying at a point directly over the basket a fruit-detaching device, as and for the purposes set forth.

3. A fruit-picker consisting of a pole carrying a pair of arms at one end, a basket swinging freely between said arms, to either side of the arms, an arch connecting said arms and extending over the basket, and a fruit-detaching device carried by said arch, said arch lying in the path of the swinging basket, so as to serve as a stop to prevent the basket turning over on its pivots in emptying.

4. A fruit-picker consisting of a pole carrying a basket-support at one end, a basket pivotally swung to said basket-support and adapted to swing freely to either side of the pole, a support attached to said basket-support at or near one of its pivots and extending directly up over the basket in approximately the same plane with the basket-pivots and basket-support, and a fruit-detaching device carried thereby at a point over the basket and extending laterally at approximately right angles to the pivots of the basket.

5. A fruit-picker consisting of a pole carrying a basket-support at one end, a basket pivotally swung from said basket-support and adapted to swing to either side of the same, and a fruit-detaching device connected to said basket-support and supported approximately over the center of the basket and projecting laterally at an angle to the line of the pivots of said basket.

In testimony whereof I hereunto affix my signature, in the presence of two witnesses, this 13th day of May, 1898.

HENRY W. PROPST.

Witnesses:
R. J. WILEY,
JOS. P. GIBSON.